United States Patent

Immel

[15] 3,704,081
[45] Nov. 28, 1972

[54] VACUUM MOLD FOR MAKING FOAMED POLYMERIC ARTICLES

[72] Inventor: Richard H. Immel, Sewickley, Pa.
[73] Assignee: Sinclair-Koppers Company
[22] Filed: Jan. 21, 1971
[21] Appl. No.: 108,273

[52] U.S. Cl. .....................425/4, 425/192, 425/812
[51] Int. Cl. ............................................B29d 27/04
[58] Field of Search...18/5 P, 17 D, 30 V, 34.1, DIG. 30, 18/DIG. 62; 425/4, 192, 812

[56] References Cited

UNITED STATES PATENTS

| | | |
|---|---|---|
| 3,331,899 | 7/1967 | Immel.......................18/5 P X |
| 2,766,484 | 10/1956 | Sanderson............18/DIG. 62 |
| 3,278,658 | 10/1966 | Immel.......................18/5 P X |

*Primary Examiner*—H. A. Kilby, Jr.
*Attorney*—Fred C. Trenor, Oscar B. Brumback and Olin E. Williams

[57] ABSTRACT

A mold for the vacuum molding of foamed cellular thermoplastic articles has two cooperating sections which when placed together define a mold cavity. Each section has three shells and two standard chests including an inner shell, an intermediate shell and an outer shell. The intermediate shell is spaced apart from the inner shell to define a first chest and the outer shell is spaced apart from the intermediate shell to define a second chest. The first chest has inlet and outlet means which are connected to a source of heating and cooling media and the second chest has inlet and outlet means which are connected to atmospheric air, compressed air and vacuum lines. A plurality of venting means communicate between the mold cavity and the second chest whereby a vacuum may be drawn or air may be charged into the mold cavity. At least one section has inlet means for passing expanded or partially expanded granules of a thermoplastic material into the mold cavity after the sections are brought together and a means for opening and closing the mold sections by moving one of the sections relative to the other.

7 Claims, 4 Drawing Figures

INVENTOR.
RICHARD H. IMMEL 3,704,081

VACUUM MOLD FOR MAKING FOAMED POLYMERIC ARTICLES

BACKGROUND OF THE INVENTION

1. Field of the Invention

This invention relates to vacuum molding of shaped cellular articles from expandable granules of a thermoplastic resin.

In conventional vacuum molding of expandable thermoplastic resins mold halves defining a mold cavity are closed and the cavity is filled with expandable polymeric beads or granules, which may have been previously partially expanded, using hot air for conveying the beads into the mold cavity. The beads are heated by the hot air as they are conveyed into the mold cavity. A vacuum is drawn in the mold cavity and the heated beads expand and fuse together to form a shaped cellular article as defined by the shape of the mold cavity. Subsequently, the mold halves are opened and air is forced therein to facilitate the release of the shaped article therefrom. The shaped article is removed and the process is repeated for making another similarly shaped cellular article.

Vacuum molding has many advantages over the conventional steam molding processes of expandable thermoplastic materials. The vacuum process is fast taking about 30 seconds for the entire procedure. The foamed articles are dry as they have not been exposed to steam and water. The beads are more excellently fused together especially in thick articles. The articles will have low density gradients especially in thick sections and improved physical properties.

2. Description of the Prior Art

My U. S. Pat. No. 3,278,658 illustrates a vacuum mold divided into two sections in which each section comprises a solid metal outer shell and a perforated or sintered metal inner shell shaped to define one part of the mold cavity and connected in a spaced relationship to the outer shell whereby a chest between the inner and outer shell is defined. This chest has inlet and outlet means which are connected to an air and vacuum source whereby air may be charged or a vacuum may be drawn in the mold cavity through the perforated inner shell. Heating and cooling means are embedded in the walls of the perforated inner shell for the circulation of cooling and heating media therethrough. The heating and cooling means in the inner shell have inlet and outlet means which are connected to a source of heating and cooling media, such as, for example, steam and water. Consequently, the mold described in my patent is unitary. For every differently shaped polymeric article to be formed in the mold described in my U. S. Pat. No. 3,278,658 there must be a corresponding mold of the desired shape. Hence the costs of vacuum molding have in some cases been a deterrent to its use.

The object of developmental efforts has been to design a single vacuum mold that is capable of making a variety of differently shaped polymeric articles. Desirably, the inner shell of the mold should be conveniently releasable from the outer shell and conveniently replaceable with a differently shaped inner shell. It may be readily observed that the perforated inner shell of my mold described in U. S. Pat. No. 3,278,658 may not easily be released from its outer shell and replaced with a differently designed inner shell.

It has been suggested to replace the inner shell described in my U. S. Pat. No. 3,278,658, having heating and cooling means embedded therein, with another chest in which heating and cooling media circulate so that the mold has standard chests with replaceable inner shells. Such a mold comprises three shells and two standard chests including an inner shell to define a part of the mold cavity, an intermediate shell spaced apart from the inner shell to define a first chest through which heating and cooling media circulate and an outer shell spaced apart from the intermediate shell to define a second chest with a plurality of venting means communicating between the second chest and the mold cavity through which air may be charged or a vacuum drawn into the mold cavity. It has been found that such a mold must be assembled such that the shells fit airtightly with each other and such that the venting means from the mold cavity to the second chest are airtight passageways. The only known method of making such a mold has been to braze all the shells together and to braze the joints between the venting means and the respective shells. But such a mold defeats the purpose of developmental efforts, i.e., to design a single mold that is capable of making a variety of differently shaped polymeric articles whereby the inner shell may easily be replaced with a differently designed inner shell without destroying the mold.

Quite surprisingly, I have developed a novel mold assembly for vacuum molding that has standard chests and replaceable inner shells as well as replaceable intermediate and outer shells. By using my invention it is now possible for a mold shop facility to purchase one mold having a plurality of differently shaped inner shells whereby a tremendous savings in mold costs is realized.

SUMMARY OF THE INVENTION

In accordance with the invention, a mold has two cooperating sections which when placed together define a closed mold cavity. Each section has three shells including a solid metal inner shell that is shaped to define one half of the mold cavity, a solid intermediate shell releasably connected in a spaced apart relationship to the inner shell to define a first or "steam and water" chest, and a solid outer shell releasably connected in a spaced apart relationship to the intermediate shell to define a second or an "air and vacuum" chest. All of these shells are bolted together with sealing gaskets disposed therebetween to provide airtight chests. Accordingly, the shells may be released from one another and replaced with a new shell, if desired.

A plurality of venting means extend between the mold cavity and the second chest or "air and vacuum" chest. The venting means comprises a hollow bolt that passes through the outer and the intermediate shell and that is threaded into the inner shell in one embodiment or that passes through the inner shell and is threaded into the intermediate shell in another embodiment.

Each hollow bolt comprises a shank, a tip at one end, and a radially outwardly extending head at the other end of the shank having a wrench gripping means to receive a wrench or the like for tightening the bolt. In one embodiment, the shank has a threaded external portion near its tip for threading into the inner shell and has a smooth external portion extending from the head of the bolt having a larger diameter than the threaded portion of the shank which smooth portion airtightly fits in the outer shell. A first bore starts from the tip of the shank and terminates at a point that is intermediate the tip and the head of the bolt, and a second bore that is normal to the first bore passes through a diameter of the bolt at the smooth portion and intersects the first bore. When the hollow bolt is properly installed into the mold the second bore lies within the second or "air and vacuum" chest thereby providing the venting means from the mold cavity to the second or "air and vacuum" chest.

In another embodiment the head of the hollow bolt engages the inner shell and the shank has external threads for threading into the intermediate shell. An axial bore completely passes through the shank starting at the tip and terminating at the head to provide the venting means from the mold cavity to the second or "air vacuum" chest.

The first chest has inlet and outlet means connected to a source of heating or cooling media, such as, for example, steam or cooling water, for circulating such heating or cooling media through the first chest and the second chest has inlet and outlet means connected to vacuum, atmospheric air, and compressed air sources for the drawing of a vacuum or the charging of air into the second chest and thereby into the mold cavity. At least one section has a means for introducing pre-expanded granules of polymeric material into the mold cavity when the sections are brought together, and a means for opening and closing the mold by moving one of the sections relative to the other.

GENERAL DESCRIPTION OF THE DRAWINGS

DETAILED DESCRIPTION

Figure 1:
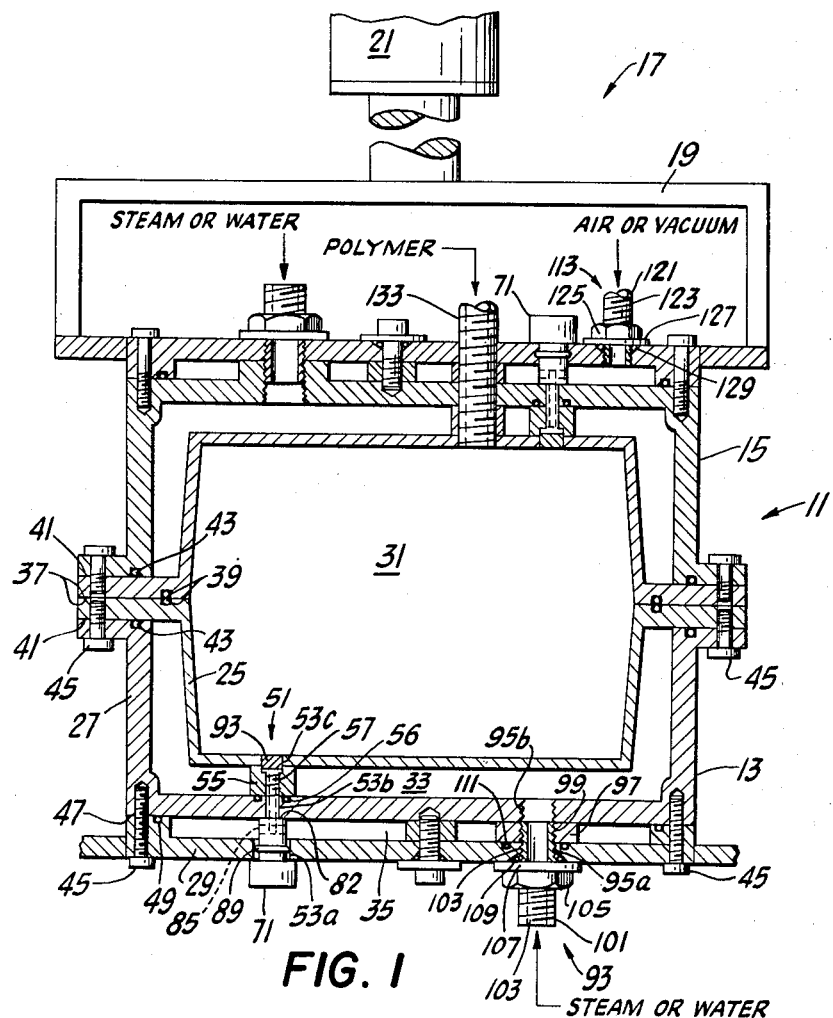
FIG. 1 is a cross sectional view of a vacuum mold in accordance with this invention.

In FIG. 1 a mold, generally indicated at 11, has a substantially cubical shape and is constructed of two sections 13 and 15. Sections 13 and 15 are held in a press, generally indicated at 17, where the sections are moveable towards and away from each other by means of connecting members 19 that are actuated by cylinder 21.

The description herein generally applies to both sections 13 and 15 and exceptions thereto will be specifically noted. Section 13 in FIG. 1 has an inner solid shell 25, an intermediate solid shell 27 and an outer solid shell 29, all of which are releasably connected together by fasteners 45, bolts, cap screws or the like such that the joints between each shell are airtight. When both sections 13 and 15 are brought together their inner shells 25 define the mold cavity 31 which imparts its shape to the polymeric article to be formed therein. In FIG. 1 the mold cavity has a substantially cubical shape, however, a mold having any desired shape may be used in accordance with the invention. The inner and intermediate shells 27 and 25 define a first chest 33 (commonly referred to as a "steam and water" chest) and the intermediate and outer shells 27 and 29 define a second chest 35 (which is commonly referred to as "an air and vacuum" chest).

In FIG. 1 inner shell 25 has mold lands 37 with a suitable gasket 39 disposed on its surface, such as, for example, a conventional O-ring sealing gasket. Lands 37 of mold 11 form an airtight seal when mold sections 13 and 15 come together. Other means for providing an airtight seal may be used in accordance with the invention. The inner shell 25 must be relatively thin, about three-sixteenths to five-sixteenths inch in thickness, and must have a relatively high coefficient of thermal conductivity so that the heating or cooling media circulating through the first chest 33 rapidly heats or cools the thermoplastic material in the mold cavity 31. The shell is preferably composed of a metal such as a stainless steel.

Intermediate shell 27 is spaced apart from the inner shell 25 as shown in FIG. 1 such that the first chest 33 is coextensive with all of the inner shell 25. Intermediate shell 27 has lands 41 with a suitable gasket 43 disposed in its surface, such as, for example, a conventional O-ring sealing gasket. Other devices for providing an airtight seal may be used in accordance with the invention. Shells 25 and 27 are secured together by fasteners 45 or the like thereby providing an airtight first chest 33.

Outer shell 29 is spaced apart from the intermediate shell 27 as shown in FIG. 1 such that the second chest is coextensive with the bottom of the mold 11; however, the outer shell 29 could be coextensive with all of the intermediate shell, if desired. Outer shell 29 has lands 47 with a suitable gasket 49 disposed in its surface, such as, for example, a conventional O-ring sealing gasket. Other devices for providing an airtight seal may be used. The shells 27 and 29 are secured together by fasteners 45 or the like, thereby providing an airtight second chest 35.

In accordance with the invention, venting means, generally indicated at 51, communicate between the mold cavity 31 and the second chest 35; a plurality of such venting means 51 are provided in each section 13. Each venting means 51 comprises a hollow bolt 71 that passes through aperture 53a in the outer shell 29 and aperture 53b in the intermediate shell 27 and that is threaded into boss 55 between the inner and intermediate shells 27 and 29, as shown in FIG. 1.

Figure 2:
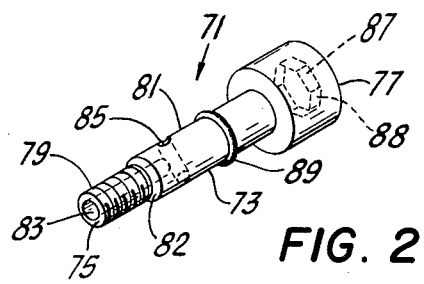
FIG. 2 is an isolated isometric view of the preferred embodiment of a hollow bolt for use in a vacuum mold.

FIG. 2 illustrates the preferred embodiment of the hollow bolt 71 of this invention. The hollow bolt 71 comprises a shank 73, a tip 75 at one end of the shank 73 and a radially, outwardly extending head 77 at the other end of the shank 73. The shank 73 includes a threaded portion 79 near the tip 75 and a smooth wall portion 81 near the head 77 having a larger diameter than the threaded portion 79 thereby defining a flange 82. A first axial bore 83 starts from the tip 75 of the bolt and terminates at a point intermediate of the tip 75 and head 77. A second bore 85, being substantially normal to the first bore 83, passes through a diameter of the bolt at the smooth wall portion 81 of the bolt and intersects the first bore 83 to provide bifurcated passageway within the bolt 71. The second bore, as illustrated in FIG. 1, lies within the second chest 35 when it is threaded into boss 55 to provide a passageway from the mold cavity 31 to the second chest 35. The head 77 of the hollow bolt includes multifaced wrenching socket means 87 comprised of a plurality of interior lands 88 and in FIG. 1 the head of the bolt is accessible from the outer shell 29. Any conventional wrench gripping means, however, may be used, such as exterior lands on the head 77. A conventional sealing gasket 89 or the like is disposed in the surface of the smooth wall portion 81 of the bolt and surrounds the bolt to provide an airtight engagement of the bolt with aperture 53a in the outer shell 29.

To insure that both chests 33 and 35 are airtight the bosses 55 or sleeves having a central internally threaded bore 57 for receiving the bolt 71 are disposed between the inner and intermediate shells 25 and 27 with the threaded bore 57 being in coaxial alignment with aperture 53c of the inner shell 25 and aperture 53b of the intermediate shell 27. The bosses may be cast integral with or may be brazed to inner shell 25. In FIG. 1 the bosses are brazed to the inner shell 25. The free end of the boss airtightly engages the opposite shell with a conventional sealing gasket 56 being disposed between the boss and the shell with which it engages. When the hollow bolt 71 is threaded into boss 55 flange 82 of the bolt engages the intermediate shell 27 and urges the intermediate shell into airtight engagement with boss 55 thereby rendering the first chest 33 completely airtight. The bolt 71 also fits airtightly within aperture 53a of the outer shell 29 because of the seal 89 between the smooth wall portion 81 of the bolt and the aperture 53a thereby rendering the second chest 35 completely airtight.

It should be noted that the bosses 55 extending between the shells 25 and 27 are permanently affixed to only one or the other of the shells 25 or 27 and are not permanently affixed to both shells as previously done in the prior art. If the bosses 55 were permanently affixed to both shells the mold could not be easily disassembled thereby defeating the purposes of my invention.

Preferably, a screen 93 or the like is disposed within aperture 53c of the inner shell 25 to prevent the passage of granules of thermoplastic material into the venting means 51 as shown in FIG. 1. The screen is designed such that it can easily be removed from the aperture 53c.

The inlet and outlet means for introducing the cooling and heating media into the first chest 33 is generally indicated at 93 in FIG. 1. A nipple 101 passes through aperture 95a of the outer shell 29 and is threaded into boss 97 between the intermediate and outer shells 27 and 29. The nipple 101 has external threads 103 on both ends and a wrench gripping means 105 intermediate of both ends of the nipple 101. A washer 107 is disposed between the wrench gripping means 105 and the outer shell 29. A conventional sealing gasket 109 is disposed around nipple 101 between washer 107 and the outer shell 29 to provide an airtight seal between the nipple 101 and the outer shell 29. The end of the nipple 101 extending from mold 11 may be fitted with a flexible hose (not shown) or the like which, in turn, is connected to a source of heating and cooling media. Consequently, the inlet and outlet means 93 is connected to the intermediate and outer shells 27 and 29 such that when means 93 is released along with fasteners 45 the intermediate and outer shells may be removed and replaced with a new shell without destruction of the mold 11. One or more nipples 101 for each mold section may be used depending on the desired amount of heating and cooling media needed to mold the articles of foamed polystyrene.

To insure that chest 35 is airtight bosses 97 having a central internally threaded bore 99 for receiving nipple 101 are disposed between the intermediate and outer shells 27 and 29 with the threaded bore 99 being in coaxial alignment with aperture 95a of the outer shell 29 and aperture 95b of the intermediate shell 27. These bosses may be cast integral with or may be brazed to intermediate shell 27. In FIG. 1 the bosses are brazed to the intermediate shell 27. The free end of the boss airtightly engages the opposite shell with a conventional sealing gasket 111 being disposed between the boss and the shell with which it engages. When nipple 101 is threaded into boss 97 the wrench gripping means engages the outer shell 29 and urges it into airtight engagement with the boss thereby rendering the second chest completely airtight.

The inlet and outlet means for drawing a vacuum or for charging air into the second chest 35 is generally indicated at 113 in FIG. 1. A nipple 121 is threaded into the outer shell 29. The nipple 121 has external threads 123 on both ends and a wrench gripping means 125 intermediate both ends of the nipple. A washer 127 is disposed between the wrenching gripping means 125 and the outer shell 29 with a conventional sealing gasket 129 being disposed between the washer and the outer shell 29 to provide an airtight seal therebetween. The end of the nipple 121 extending from the mold 11 may be connected to a flexible hose (not shown) or the like which, in turn, is connected to a source of air and vacuum. The means for introducing the partially expanded granules of thermoplastic material into mold 11 is generally indicated at 133 in FIG. 1. Any conventional means for introducing such granules into the mold cavity 31 may be used such as the apparatus described in U. S. Pat. No. 3,424,827. The means for attaching such apparatus to the mold 11 of my invention may be similarly done as theretofore described in respect to the hollow bolt 71. When the shells are to be removed and replaced with new shells, means 133 may simply be unthreaded and released in a similar fashion as the hollow bolts of the invention.

Figure 3:
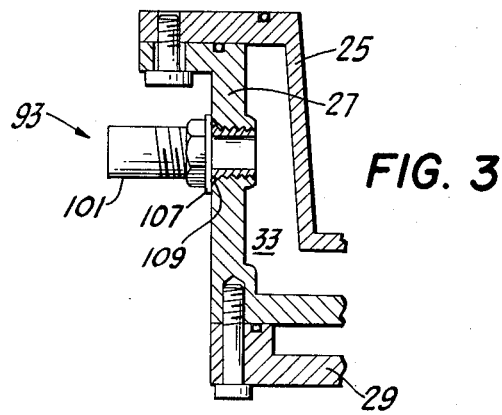
FIG. 3 is a partial cross sectional view of a sidewall of a vacuum mold of this invention.

FIG. 3 illustrates another embodiment of a vacuum mold of this invention where the inlet and outlet means 93 for the heating and cooling media passes through the intermediate shell 27 as shown. The nipple 101 is threaded into the intermediate shell 27 with a conventional sealing gasket 109 being disposed between washer 107 and the intermediate shell 27. It should be noted that a boss or the like is unnecessary in this embodiment for providing completely sealed chests.

Figure 4:
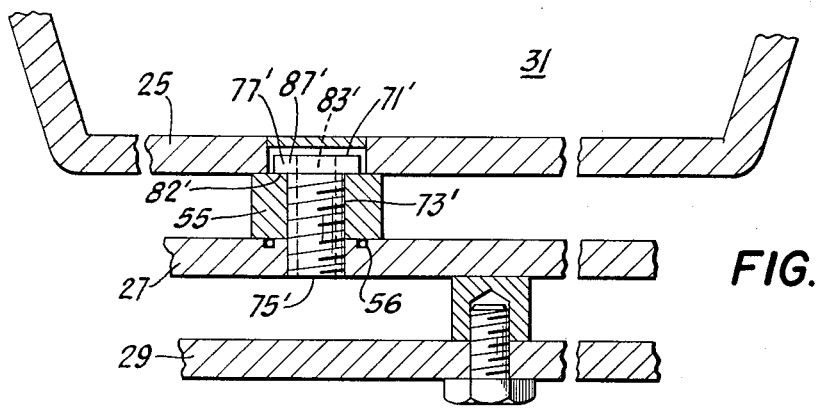
FIG. 4 is a partial cross sectional view of another embodiment of a vacuum mold of this invention, particularly illustrating another embodiment of a hollow bolt for use in a vacuum mold.

FIG. 4 illustrates another embodiment of a hollow bolt of this invention being disposed in mold 11. Hollow bolt 71' comprises an externally threaded shank 73', a tip 75' at one end, a radially outwardly extending head 77' at the another end and a flange 82' between head 77' and shank 73'. The head 77' includes a multi-faced wrenching socket 87' which is accessible from the mold cavity 31. An axial bore 83' extends completely from the tip 75' of the bolt through the head 77'. As illustrated in FIG. 4 the bolt passes through boss 55 from the mold cavity and is threaded into shell 27. Boss 55 is brazed to inner shell 25 and its free end engages intermediate shell 27 with a sealing gasket 56 there between. Flange 82' engages boss 55 to urge the free end of boss 55 into airtight engagement with the intermediate shell 27.

In operation, both mold sections 13 and 15 are brought together by actuating cylinder 21 to bring the mold sections 13 and 15 together such that they are airtight. The mold cavity is brought to a desired temperature by circulating steam or a suitable heating media into the first or "steam and water" chest 33 by passage through inlet means 93. A selected amount of partially expanded granules of thermoplastic resin are conveyed through means 133 by hot air into the mold cavity 31. A vacuum is drawn on the second or "air and vacuum" chest 35 whereby air within the mold cavity passes through the hollow bolts 71 into the chest 35 and thence through the outlet means 113. The partially expanded granules expand completely and fuse together filling the mold cavity 31. Subsequently, the steam or heating media is expelled from the "steam and water" chest 33 and a cooling media, such as, for example, water passes into the first chest 33 to cool the shaped articles in the mold cavity. The sections 13 and 15 are parted by actuating cylinder 21 to separate mold sections 13 and 15. Air is simultaneously readmitted into the mold cavity by way of the inlet means 113 and hollow bolts 71 to facilitate the release of the shaped article from the mold sections 13 and 15, and the shaped article is removed. The entire process may then be repeated.

To replace inner shell 25 with a new or differently shaped inner shell sections 13 and 15 are parted. On each section bolts 45 holding inner shell 25 and intermediate shell 27 together are released and hollow bolts 71 are also released. The inner shell is removed and replaced with a new or differently shaped inner shell. Bolts 45 and hollow bolts 71 are attached and the mold is ready for subsequent use.

Hence, the vacuum mold of this invention greatly reduces the expenses of vacuum molding shaped cellular articles from expandable granules of a thermoplastic material. The inner shell of the vacuum mold, which shapes the polymeric article formed therein, is conveniently releaseable from the standard intermediate and outer shells so that a differently shaped inner shell may simply be attached to the standard intermediate and outer shells.

What is claimed is:

1. A mold for use in vacuum molding of shaped, foamed, cellular thermoplastic articles from expandable thermoplastic material, comprising:
   a. two cooperating mold sections that are capable of forming an airtight cavity when both sections are brought together; each section comprising:
      i. a solid inner shell shaped to define one part of the mold cavity; said inner shell having lands capable of forming an airtight seal when said sections are brought together;
      ii. a solid intermediate shell releasably connected with fasteners in a coextensive spaced apart relationship to said inner shell to define a first chest; said intermediate shell having lands engaging said inner shell which lands are capable of forming an airtight seal with said inner shell;
      iii. a solid outer shell releasably connected with fasteners in a spaced apart relationship to said intermediate shell to define a second chest; said outer shell having lands engaging said intermediate shell which lands are capable of forming an airtight seal with said intermediate shell;
      iv. a plurality of venting means extending between said mold cavity and said second chest for providing an airtight passageway therebetween such that said shells are releasable from each other;
      v. inlet and outlet means connecting said second chest to vacuum and air sources;
      vi. inlet and outlet means connecting said first chest to cooling and heating media for circulation of said media through said first chest; and
   b. at least one section having inlet means for introducing said expandable material into said mold cavity when said sections are brought together; and
   c. at least one section having means for opening and closing said mold by moving one of said sections relative to the other.

2. The mold of claim 1 wherein each of said venting means comprises a hollow bolt that passes through said outer and intermediate shell and that is threaded into said inner shell for providing a passageway from said mold cavity to said second chest.

3. The mold of claim 1 wherein each of said venting means comprises a hollow bolt that passes through said inner shell and that is threaded into said intermediate shell for providing a passageway from said mold cavity to said second chest.

4. The mold of claim 2 wherein said bolt comprises:
   a. a shank having an externally threaded portion at one end thereof;
   b. a radially extending head at the other end of said shank;
   c. an axial first bore in said threaded portion extending from the terminal end thereof toward said head; and
   d. a second bore, disposed normal to said first bore, passing through said shank and intersecting said first bore, thereby providing a bifurcated passageway in said bolt; and
   e. said bolt being so positioned in said mold that said second bore communicates with said second chest.

5. The mold of claim 4 wherein:
   a. said bolt has a groove in said shank; and
   b. a sealing gasket in said groove that provides a seal between said bolt and said outer shell.

6. The mold of claim 3 wherein said hollow bolt comprises:
   a. an externally threaded shank;
   b. a tip at one end of said shank;
   c. a radially extending head at the other end of said shank; and
   d. an axial bore completely passing through said shank starting at the tip and terminating at the head for providing a passageway from said mold cavity to said second chest.

7. The mold of claim 1 wherein each of said venting means comprises:
 a. apertures in said inner and intermediate shells that are coaxially aligned;
 b. a boss having an internally threaded bore extending between said inner and intermediate shells; with said bore being coaxially aligned with said apertures; one end of said boss being fixed to said inner shell; and
 c. a hollow bolt being threaded into said boss for providing the passageway from said mold cavity to said second chest and for forcing said intermediate shell into airtight engagement with said boss.

* * * * *